US010533600B1

(12) United States Patent
Jackson et al.

(10) Patent No.: US 10,533,600 B1
(45) Date of Patent: Jan. 14, 2020

(54) THREADED FASTENER LOCKING SYSTEM (71) Applicants: Ian Jackson, Ceres, CA (US); Daniel Martell, Modesto, CA (US); Justin Church, Modesto, CA (US)

(72) Inventors: Ian Jackson, Ceres, CA (US); Daniel Martell, Modesto, CA (US); Justin Church, Modesto, CA (US)

(73) Assignee: Hard Case Performance, Modesto, CA (US)

( * ) Notice: Subject to any disclaimer, the term of this patent is extended or adjusted under 35 U.S.C. 154(b) by 17 days.

(21) Appl. No.: 15/669,112

(22) Filed: Aug. 4, 2017

Related U.S. Application Data (60) Provisional application No. 62/372,111, filed on Aug. 8, 2016.

(51) Int. Cl.
| F16B 39/10 | (2006.01) |
| F16B 39/12 | (2006.01) |
| B60B 27/06 | (2006.01) |

(52) U.S. Cl.
CPC .......... *F16B 39/101* (2013.01); *B60B 27/065* (2013.01); *F16B 39/12* (2013.01); *B60B 2900/331* (2013.01)

(58) Field of Classification Search
USPC ..................... 411/91, 94, 102, 119, 120, 966
See application file for complete search history.

(56) References Cited

U.S. PATENT DOCUMENTS

| 632,501 | A | * | 9/1899 | Ling | ............................. 411/94 |
| 1,131,053 | A | * | 3/1915 | Garland | ................. F16B 39/10 411/91 |
| 2,409,907 | A | * | 10/1946 | Shakesby | ............... B60K 15/04 220/DIG. 4 |
| 2,626,837 | A | * | 1/1953 | Wilson | ...................... B60B 3/16 301/35.624 |
| 3,008,554 | A | * | 11/1961 | Hodgson | ................... B64C 1/06 403/21 |
| 4,735,533 | A | * | 4/1988 | Gallagher | ............... F16K 35/00 411/119 |
| 4,737,057 | A | * | 4/1988 | Olsson | .................. F16B 39/101 411/100 |
| 4,875,395 | A | * | 10/1989 | Alvarez | ................ B60B 29/004 81/13 |
| 4,925,249 | A | * | 5/1990 | Auspelmyer | ............. B60B 3/14 301/111.01 |
| 7,182,562 | B2 | * | 2/2007 | Botosan | ................ F16B 39/103 411/120 |

(Continued)

*Primary Examiner* — Gary W Estremsky
(74) *Attorney, Agent, or Firm* — Heisler & Associates (57) ABSTRACT

Fasteners such as bolts or nuts are locked by a ring and associated keys. The ring typically has a series of holes with the fasteners passing through these holes in the ring. The ring has an outer surface with studs extending upward therefrom. Typically one key for each fastener is placed adjacent to the ring after the fasteners are tightened against the ring in each hole of the ring. The key has a head opening which fits over a head of the fastener and keeps the fastener from rotating. The key also has a bore which fits upon the stud, with the stud preventing key rotation, and the key in turn preventing fastener rotation. A retainer such as a lock nut on a threaded stud or a snap ring in a grooved stud hold the key to the ring and keep the ring in position locking the fasteners.

18 Claims, 4 Drawing Sheets

(56) References Cited

U.S. PATENT DOCUMENTS

| | | | | |
|---|---|---|---|---|
| D658,109 S | * | 4/2012 | Cavanaugh | D12/213 |
| 8,337,129 B2 | * | 12/2012 | Boyce | F16B 31/028 |
| | | | | 411/102 |
| 9,188,149 B2 | * | 11/2015 | Bennett | F16B 41/005 |

* cited by examiner

THREADED FASTENER LOCKING SYSTEM

CROSS-REFERENCE TO RELATED APPLICATIONS

This application claims benefit under Title 35, United States Code § 119(e) of U.S. Provisional Application No. 62/372,111 filed on Aug. 8, 2016.

FIELD OF THE INVENTION

The following invention relates to systems, apparatuses and methods for preventing threaded fasteners from inadvertently rotating loose when the threaded fasteners are holding items to a structure. More particularly, this invention relates to systems where a key fits over a head of a threaded fastener and prevents the head of the threaded fastener from rotating, such as a set of threaded fasteners which hold a wheel onto a hub of an axle.

BACKGROUND OF THE INVENTION

Wheels of vehicles can be driven in a variety of different ways. One way to drive a wheel which is commonly used on motorcycles, but is also usable on other vehicles is to mount the wheel in a manner allowing it to freely rotate at a hub thereof upon an axle, and then to attach a wheel drive element to the wheel that is to be driven. Such a wheel drive can be in the form of a pulley, such as when the wheel is driven by a belt, or can be in the form of a sprocket, such as when the wheel is being driven by a chain. Whether the wheel drive is in the form of a pulley or a sprocket (or other wheel drive), the wheel drive element is fixed to the wheel in a position surrounding the hub of the wheel and typically with a center point of the wheel drive aligned with a rotational axis of the wheel.

The wheel drive is typically not formed along with the wheel, but rather is removably attachable to the wheel. Such removable attachability facilitates replacement of the wheel drive, such as to substitute a different wheel drive having different performance parameters or to provide maintenance on the wheel drive or on the wheel while separate from the wheel or wheel drive. To allow the wheel drive to be removably attached to the wheel a common fastening arrangement involves bolt bores formed in the wheel near the hub which have female threads therein and with the wheel drive having holes alignable with these bolt bores so that bolts can pass through the holes in the wheel drive and then thread into the bolt bores in the wheel. When these bolts are tightened down, the wheel drive is effectively secured to the wheel.

While this multiple bolt arrangement for fastening the wheel drive to the wheel is generally effective, it is vulnerable to the loosening of the bolts over time which can lead to diminished performance or even potentially catastrophic failure of the drive system. Accordingly, it is important to ensure that these bolts remain tightly threaded into the bolt bores in the wheel. Similarly, wheels are held to hubs, propellers are held to output shafts and other items are held to structures with a series of fasteners (or at least one). Known prior art solutions for keeping these bolts (or other fasteners, such as lug nuts) secure have not been entirely effective, such that there is an ongoing need for simple and effective ways to keep the bolts locked tightly to the wheel, so that the wheel drive or other item can be held securely to the wheel or other structure.

SUMMARY OF THE INVENTION

With this invention a bolt locking system is provided for keeping the bolts tightly held to the threaded bolt bores of the wheel so that the wheel drive can be held securely to the wheel except when removal is called for. The bolt locking system generally includes two separate components including a ring and a series of keys, typically with one key for each bolt. In the embodiment disclosed herein with greatest detail, five bolts are provided, so that five keys would preferably be utilized.

The ring is most generally an annulus in form. Unique from typical washers, in that instead of being merely a single annular disk for surrounding a single bolt, the ring is preferably in the form of an annular ring which has a series of bolt holes passing therethrough at locations spaced radially a common distance from a center of the ring and with one bolt hole for each bolt. These bolt holes are spaced apart a distance similar to the spacing between the holes passing through the wheel drive and the bolt bores of the wheel. Most preferably, this ring is somewhat fattened in distance between an inner edge and an outer edge thereof adjacent to each of these bolt holes, so that the drive washer has an appearance as if five standard annular washers were placed precisely where required and then the material from which the washers were formed grew slightly so that the washers would become joined together. The entire ring preferably has a common thickness between inside and outside surfaces which are substantially planar and parallel to each other.

In addition to the holes passing through the ring between the inside and outside surfaces, stud holes are also provided, with one stud hole at a midpoint between each pair of bolt holes. These stud holes are typically smaller in size and preferably have a circular form. As an alternative, the stud holes could have a non-circular form and still function according to this invention. Studs are provided which are press fit into these stud holes (or otherwise formed into the ring) and extend perpendicularly from the outside surface of the drive washer a distance similar to a thickness of the keys (described in detail below) and a thickness of a nut (or other retainer), and optionally a thickness of a nut washer. As an alternative to the stud holes and studs, the drive washer could be machined or otherwise formed with the studs integral with the drive washer The studs include a press fit base and a threaded top. The threaded top is cylindrical in form with male threads thereon sized to mate with the female threads of a nut. The press fit base has a geometry matching that of the stud holes (typically circular) and preferably with a size causing it to have a slight interference fit with the stud holes so that the studs can be press fit into the stud holes and be securely held to other portions of the drive washer. In the embodiment depicted, the ring has five bolt holes and five stud holes with each of the stud holes fitted with a stud extending from an outer surface thereof.

The inner surface of the ring is placed adjacent to the item to be held. The ring thus acts as a single washer structure to support each of the bolts passing through the ring and then through the bolt recesses passing through the item and then into the bolt bores of the wheel. During use of the bolt locking system of this invention, the ring is first placed in position with these bolt holes of the drive washer aligned with the holes passing through the wheel drive and the bolt bores in the wheel, and the bolts are then passed through these aligned chambers with threading of the bolts into the bolt bores until the bolts are tightened with heads of the bolts against the outer surfaces of the ring and with the threaded shafts of the bolts threading into the bolt bores in the wheel. The wheel drive or other item is thus held to the wheel or other structure.

To keep the bolts from coming loose, such as due to the effects of vibration on the bolts or other forces which might tend to loosen the bolts, the keys are utilized. Each key is a planar rigid structure with inner and outer surfaces which are substantially planar, parallel to each other and spaced apart by a distance defining a thickness of each key. Each key has two holes passing from the inner surface to the outer surface. A smaller hole is provided as a bore for stud passage which is sized to allow the stud to pass therethrough.

The second hole in the key is provided as a head opening passing from the inner surface to the outer surface. This head opening is sized sufficiently large to allow the head of the bolt to reside within this recess. The geometry of the head opening is selected so that the head of the bolt can fit within the opening but is resisted from rotation when located within the opening. A preferred form of this head opening is for it to have a generally hexagonal form should the head of the bolt have a hexagonal form (but could optionally have other geometries if the head of the bolt has other geometries). The head opening thus includes a series of points spaced apart by a series of sides. Preferably, the points are arcuate in form (concave relative to a center of the opening) and the sides are arcuate in form (convex relative to the center of the opening) with the sides joining each corner together, and with each side having a similar length and with each point spaced apart from adjacent points by a similar distance. The points and sides of the head opening thus cause the head opening to have a radially symmetrical hexagonal form.

This configuration for the head opening allows a head of a bolt to rotate slightly while within the head opening before the head abuts sides of the head opening in a fashion which resists any further rotation of the bolt. A small amount of tolerance accommodated by this shape of the head opening assists in allowing the keys to be placed after the bolts have been placed and tightened, and so that the position of each bolt and the particular orientation of the head of each bolt is able to be accommodated by the key. If necessary, a small amount of additional tightening of each bolt can be provided until the key fits with the head of the bolt residing therein. The keys thus prevent the bolts from becoming loose and in turn prevent the wheel drive or other item from becoming detached from the wheel or other structure, or to exhibit any looseness relative to the wheel.

Finally, and to keep each key in position holding each bolt firm, a nut (or other retainer, such as a snap clamp) is threaded onto each of the threaded tops of each of the studs. Most preferably, a nut washer is first placed over the threaded top of each stud and then a nut is placed over the threaded top of the stud and tightened. The nuts can be in the form of lock nuts or can be utilized with lock washers, or a combination thereof, so that the nuts resist coming loose.

A user can readily determine from viewing the bolt locking system whether each of the keys are in place or not. If any of the keys have become dislodged, the keys can be replaced before the bolts have any opportunity to come loose. Thus, even if a nut comes loose or is removed, one can readily see by a visual inspection whether the bolt locking system is operational or not before the bolts have any opportunity to loosen appreciably.

While the keys are shown in this preferred embodiment as having a separate key for each bolt, as an alternative a key plate could be provided with a series of head recesses for each head of each bolt so that a single key with multiple such holes would be provided rather than multiple separate keys. Such a system requires that each of the bolts be somewhat precisely positioned with their heads oriented properly to fit within the head recesses, illustrating the benefits to the separate keys of the preferred embodiment over such a single key option. As a further alternative, keys could be provided with a lesser number of head openings than the total number of bolts, but with each key having two or more such openings for heads of bolts. Such multiple head opening keys would also have multiple holes for mounting upon studs of the ring.

OBJECTS OF THE INVENTION

Accordingly, a primary object of the present invention is to provide a system for holding threaded fasteners in an attached configuration, and preventing the threaded fasteners from coming loose.

Another object of the present invention is to provide a system for holding bolts, nuts or other threaded fasteners in an attached position to prevent inadvertent detachment.

Another object of the present invention is to provide a system and method for reliably holding a wheel onto a hub, or holding some other analogous item to a structure (such as a propeller to an engine output shaft).

Another object of the present invention is to provide a method for securely holding threaded fasteners in an attached orientation.

Another object of the present invention is to provide a threaded fastener locking system which can be used on either nuts or bolts, such as lug nuts and lug bolts which hold a wheel onto a hub or which hold a drive sprocket or other mechanism to a wheel and/or hub.

Other further objects of the present invention will become apparent from a careful reading of the included drawing figures, the claims and detailed description of the invention.

BRIEF DESCRIPTION OF THE DRAWINGS

FIG. 8 is a perspective view of the ring of FIG. 4 and with one key shown mounted thereon and adjacent to a fastener in the form of a bolt, and with a washer and snap ring retainer for holding the key to the ring. While only one bolt and one key are shown, and the system of this invention could conceivably work with just one fastener and one key, most typically each of the holes in the ring with support a separate fastener adjacent thereto, and each of the studs and holes would have a key associated therewith to secure each of the threaded fasteners. While the key is shown adjacent to the ring and with the bolt off of the ring, typically the bolt would first be tightened to a structure on a side of the ring opposite the head of the bolt (or other fastener) and the fastener would be tightened, before placement of the key adjacent to the ring.

DESCRIPTION OF THE PREFERRED EMBODIMENT

Referring to the drawings, wherein like reference numerals represent like parts throughout the various drawing figures, reference numeral 10 is directed to a bolt locking system (FIGS. 1-3) defining a preferred embodiment of the threaded fasteners locking system of this invention. The system 10 is configured to lock bolts B to an adjacent structure such as a hub or axle A, such as with a wheel W held adjacent to the axle A by the bolt B (FIG. 3). The bolt B could be replaced with a fixed threaded shaft and nut fastener configuration. In such an alternative arrangement, the fastener would be both the nut and the threaded shaft which would be fixed to the axle A, hub or other structure. While a wheel W is shown held to the axle A by the bolt B, some other stem separate from the wheel W or in addition to the wheel W could be held in position by the bolts B, such as a sprocket or other drive system, or to hold other items to a structure with one or more threaded fasteners. The system 10 facts to hold a head H of the bolt B or other fastener so that it is prevented from substantial rotation and so that it cannot become unthreaded and loosened, and so that items held by the bolts B or other fasteners to the structure our reliably locked in place.

Figure 1:
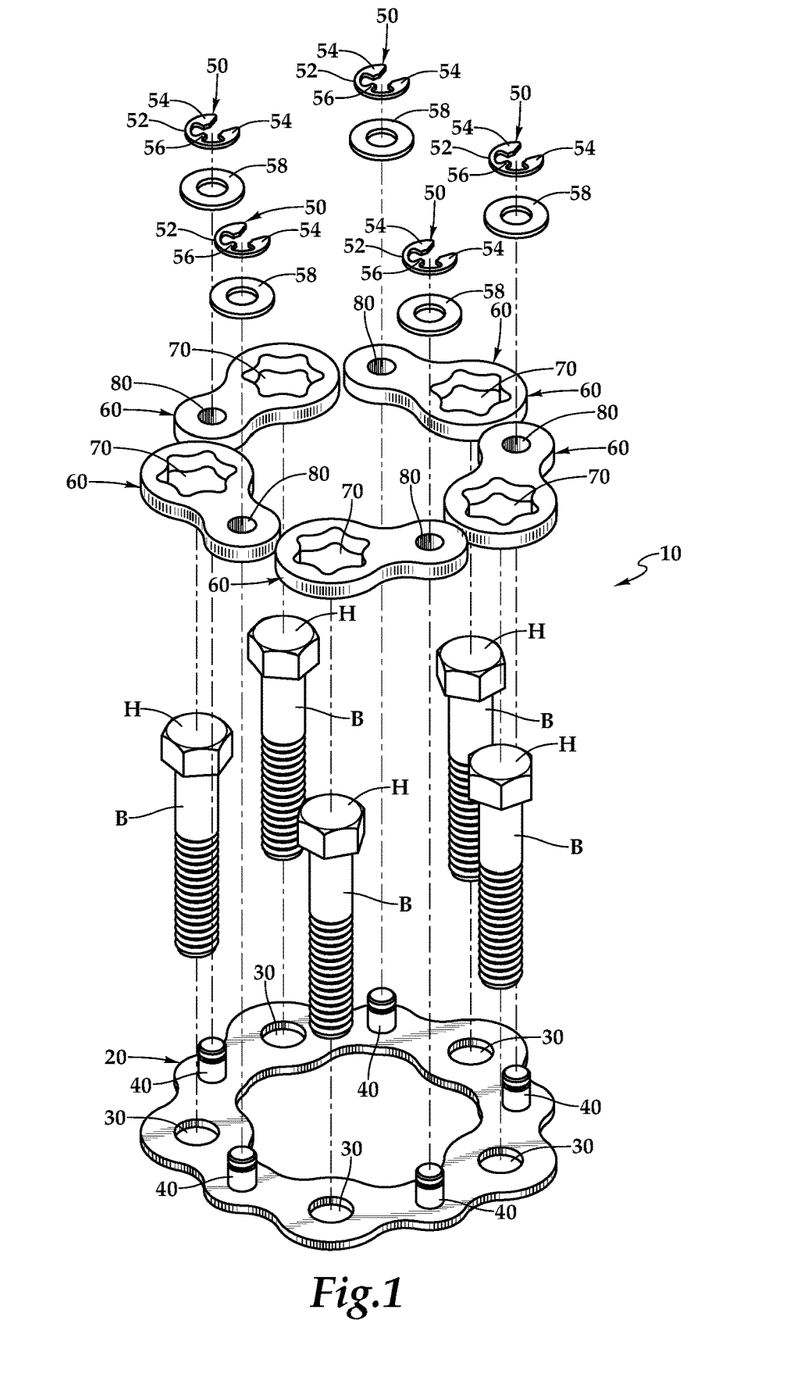
FIG. 1 is an exploded perspective view of the system of this invention shown with a series of bolts as threaded fasteners to be secured by this first embodiment of the invention. The bolts thread into threaded holes in a hub of an axle or other structure, such as that shown in FIG. 3. While five bolts are shown, the invention could be modified to accommodate a greater or less or number of bolts or other threaded fasteners. The bolts could be replaced with threaded shafts fixed to the hub, so that instead of bolts, nuts would be provided which thread onto such threaded shafts fixed to such a hub, and still otherwise be fasteners similar to this embodiment of the invention.
Figure 2:
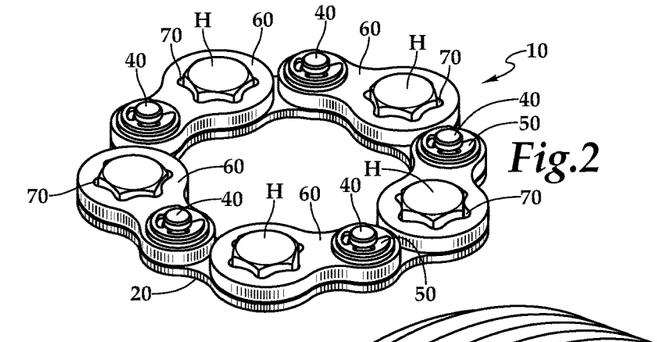
FIG. 2 is a perspective view of that which is shown in FIG. 1, with the various parts thereof shown assembled together.
Figure 3:
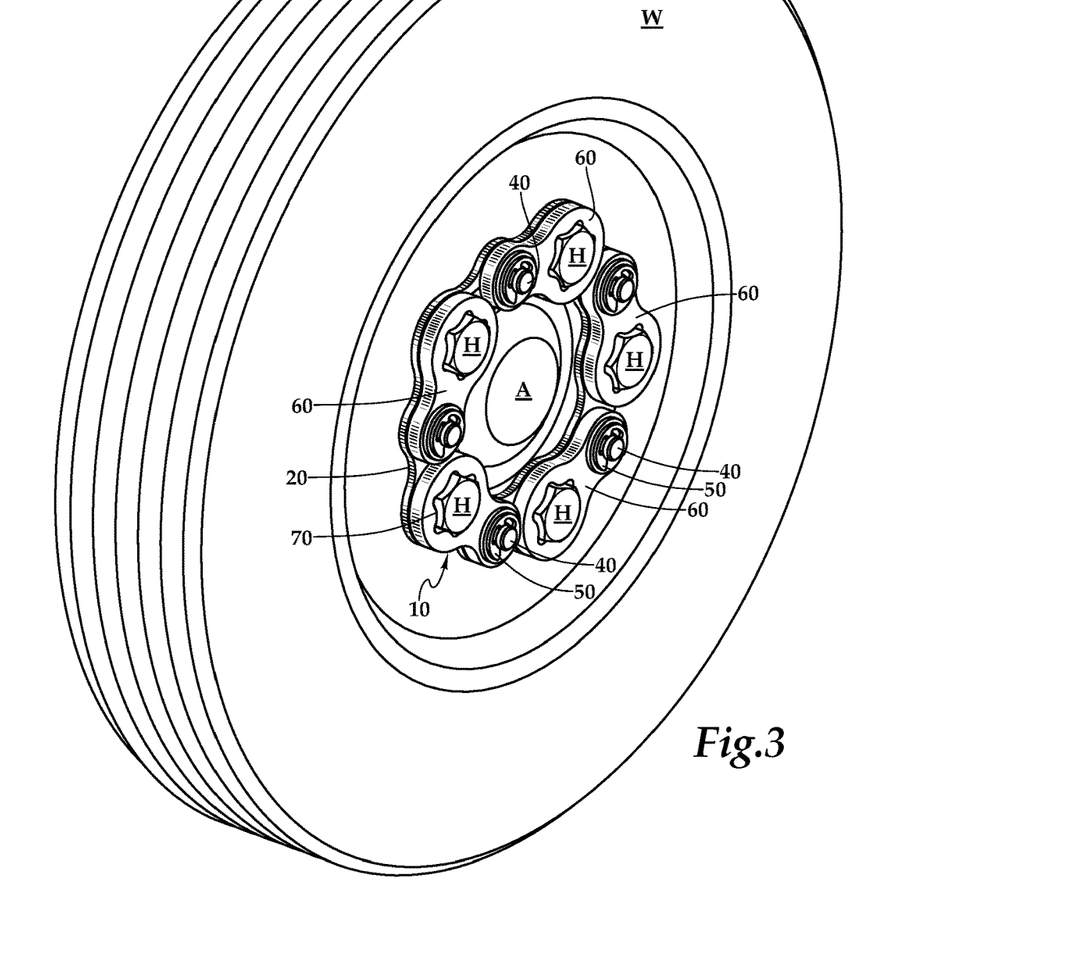
FIG. 3 is a perspective view of the locking system of FIG. 2, shown mounted onto a wheel, and holding a wheel to a hub of an axle as one use for the locking system of this invention.

In essence, and with particular reference to FIGS. 1-3, basic details of the bolt locking system 10 are described, according to a first embodiment. The bolt locking system 10 includes a ring 20 of generally annular form with at least one hole 30 passing therethrough, and typically a series of holes 30 matching a position and number of bolts B or other fasteners. The ring 20 also includes studs 40 extending from the ring 20, with preferably one stud 40 associated with each hole 30 and spaced a similar distance from an associated hole 30. At least one key 60 is provided with the ring 20, and preferably one key 60 for each hole 30 and stud 40 pair. Each key 60 has a head opening 70 which fits over the head H of the bolt B with a shape and size to prevent head H rotation, as well as a bore 80 which is sized to fit over the stud 40. A snap clamp 50 snaps to the stud 40 and holds the key 62 the ring 20. In an alternative bolt locking system 110, a similar ring 120 with holes 130 is provided, but with threaded studs 140. The similar key 160 is provided with head openings 170 and a bore 180. In place of snap clamps 50 acting on the studs 40, locknuts 150 act as retainers acting upon the threaded studs 140 to hold the keys 160 to the ring 120.

Figures 4, 5, 6:
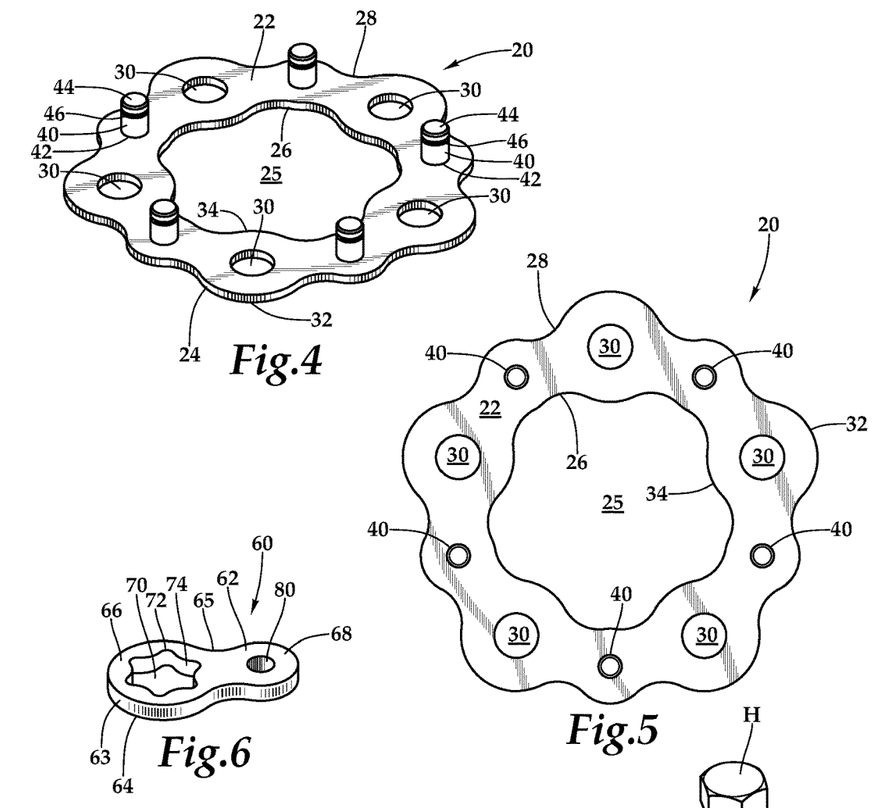
FIG. 4 is a perspective view of a ring portion of the locking system of FIGS. 1-3.
FIG. 5 is a top plan view of that which is shown in FIG. 4.
FIG. 6 is a perspective view of a key such as that utilized to secure fasteners as shown in FIGS. 1-3.

More specifically, and with particular reference to FIGS. 1, 4 and 5, details of the ring 20 portion of the bolt locking system 10 are described, according to this first embodiment. The ring 20 is a rigid structure, typically of metal (e.g. aluminum) which preferably has a constant thickness planer form between an outside surface 22 and an inside surface 24. The ring 20 preferably has a central opening 25 so that it is annular, extending between an outer edge 28 and an inner edge 26. In one embodiment, these edges 26, 28 are circular. Most preferably, these edges 26, 28 are curved in a series of convex and concave curves as they circumscribe a center of the central opening 25.

Holes 30 pass through the ring 20 with each of the holes 30 a constant distance from a centerpoint of the central opening 25. While it is conceivable that only a single hole 30 could be provided through the ring 20, preferably a number of holes 30 matches the number of fasteners, such as bolts B, which are to be held by the system 10. These holes 30 (five in the particular embodiment shown) are spaced a constant distance from each other in a typical embodiment and midway between the inner edge 26 and outer edge 28. Preferably, the ring 20 is fatter between the inner edge 26 and outer edge 28 where the holes 30 are located. Thus, the outer edge 26 has outer lobes 32 adjacent each hole 30 and inner lobes 34 in the inner edge 26 adjacent to each of the holes 30. Thus, adjacent to each hole 30, the edges 26, 28 are convex, with concave locations between each convex location in the edges 26, 28. Most preferably, the lobes 32, 34 have a constant radius of curvature centered upon a center of each hole 30.

The studs 40 are preferably located at midpoints between each set of holes 30. While conceivably there could be just one stud 40, preferably each hole 30 has an associated stud 40. In the most preferred embodiment, with the studs 40 at the midpoint between each hole 30, each hole 30 can be associated with one of two studs 40 adjacent to each hole 30. As described in detail below, a center of each hole and a center of each stud are preferably spaced apart by distance similar to a distance between the head opening 70 and bore 80 of each key 60.

The studs 40 preferably are planar cylindrical structures extending from a root 42 adjacent to the ring 22 a tip 44 opposite the root 42. A groove 46 is formed in each stud 40 closer to the tip 44 then to the root 42 in this embodiment, and oriented within a plane parallel with the tip 44 in parallel with the outside surface 22 of the ring 20. This groove 46 receives a snap clamp 50 therein.

The snap clamp 50 (also referred to as a snap ring) has a somewhat "C" shaped form with an arch 52 extending to a pair of ears 54 which are spaced apart from each other by a distance slightly less than a diameter of the stud 40. A tab 56 extends from the arch 52 at a location midway between the ears 54. Space between the ears 54 and tab 56 is similar in size to a portion of the stud 40 we can the groove 46. The ears 54 are sufficiently close together that they need to be flexed away from each other slightly when they are located within the groove 46 of the studs 40 and translated (along arrow C of FIG. 8) into the groove 46 and onto the stud 40. After the ears 54 pass more than 50% into the grooves 46, the ears 54 snap closer together to securely hold the snap clamp 50 within the groove 46.

Figure 8:
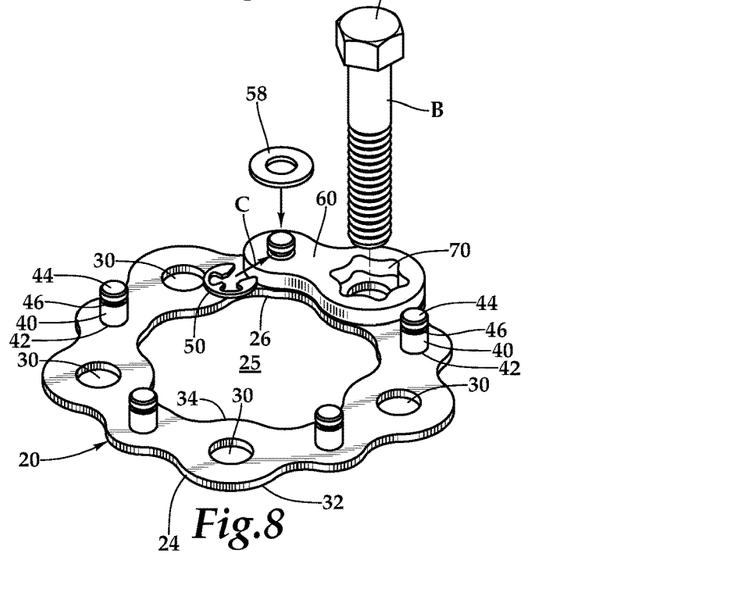

The snap clamps 50 can be grasped, such as by pliers or other tools, and pulled laterally in reverse fashion to unsnap the snap clamps 50 out of the grooves 46 and for removal of the snap clamps 50 from the studs 40, should a key 60 need to be removed from the stud 40. The spacing of the grooves 46 away from the root 42 of the studs 40 and away from the outside surface 22 of the ring 20 is preferably similar to a thickness of the key 60, so that the snap clamps 50 are adjacent to the key 60 and securely hold the key 60 in position adjacent to the ring 20 when the key 60 is installed and secured by the snap clamps 50.

Figure 7:
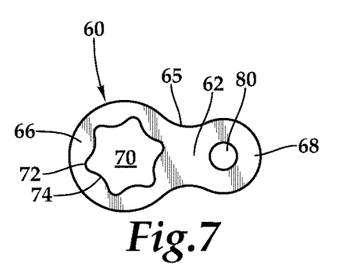
FIG. 7 is a top plan view of that which is shown in FIG. 6.

With particular reference to FIGS. 6-8, details of the keys 60 are described, according to this first embodiment. Each key 60 is a rigid structure preferably formed of metal (e.g. aluminum) and which works along with the ring 20 to lock the bolt B or other fasteners in position. While as few as one key 60 can be utilized along with the ring 20, preferably a key 60 is provided for each hole 30 and for each bolt B or other fastener to lock each of the bolts B or other fasteners.

The key 60 includes an outer surface 62 opposite an inner surface 64 and preferably with a planar form and constant thickness between the surfaces 62, 64. A perimeter edge 63 extends between the inner surface 64 and outer surface 62. The key 60 includes a large end 66 opposite a small end 68. A waist 65 is located between the large end 66 and small end 68 defining a lesser width of the key 60 between the ends 66, 68 that is present at either of the ends 66, 68, in the most preferred form of this invention. The large end 66 includes the head opening 70 therein. The small end 68 includes the bore 80 therein. Preferably the head opening 70 and bore 80 are centered within their associated ends 66, 68 of the key 60.

The head opening 70 passes entirely through the key 60 from the outer surface 62 to the inner surface 64. This head opening 70 is provided with a particular size and shape to fit over the head H of the bolt B or other fastener (e.g. a nut threadable onto a threaded shaft), and to prevent the fastener from rotating. Typically, the head H has a hex perimeter shape. The head opening 70 for such a hex head H is preferably slightly larger in size and generally hex shaped, but most preferably has six points 72 equally spaced from each other and with curved walls 74 therebetween. The curved walls 74 have only a small tolerance to accommodate the head opening 70, so that corners of the hex head H can fit into each of the points 72. With such a shape, the head H can only rotate a small amount (or not at all) before it impacts the surfaces of the head opening 70 and the key 60 resists further rotation of the head H of the fastener. Other shapes for the head opening 70 could be provided, including a shape which matches precisely (except for with a small tolerance) a shape of the head H. The bore 80 is a plane bore sized to allow the stud 40 to pass through the bore 80.

Figures 9, 10:
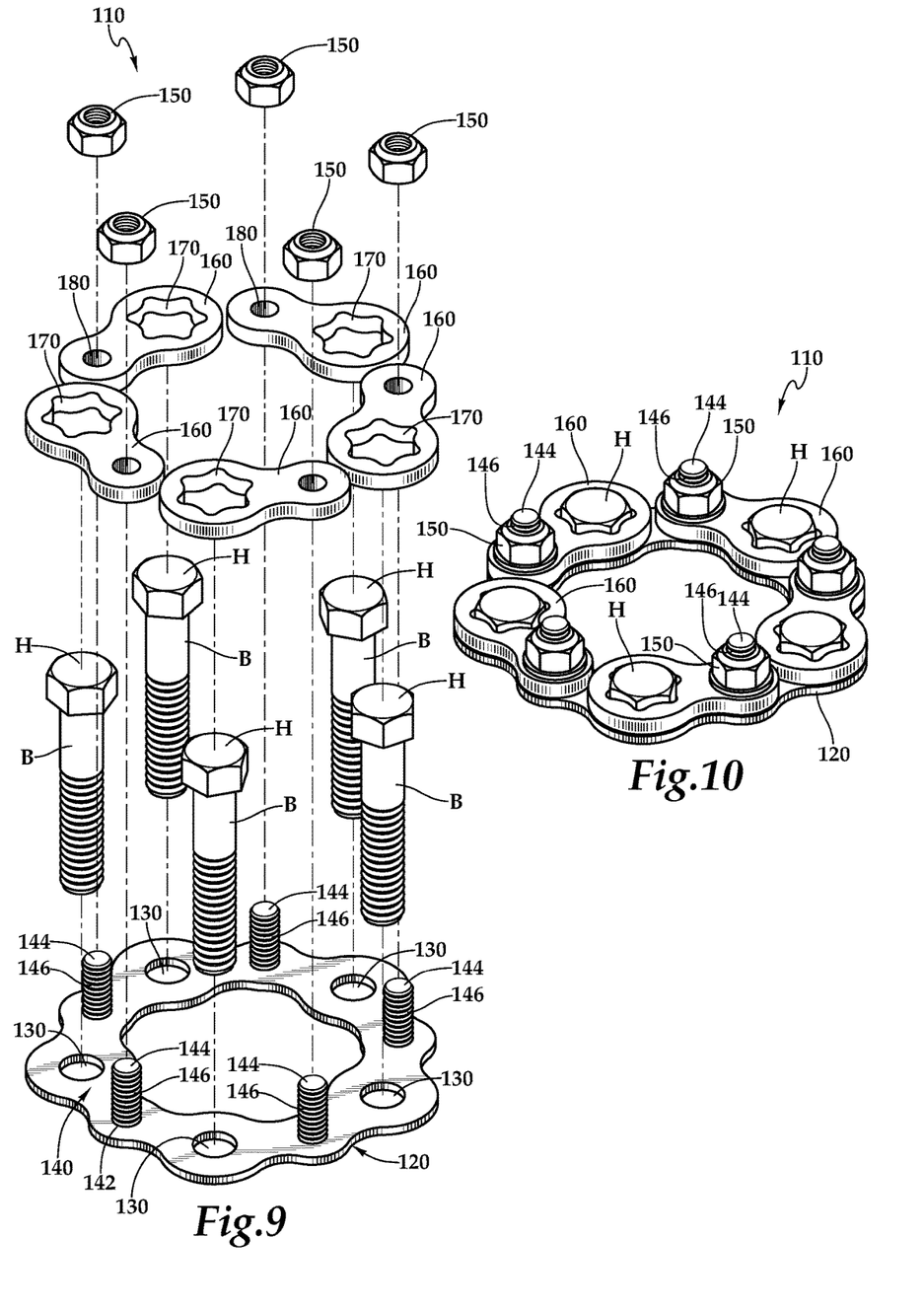
FIG. 9 is a perspective exploded parts view of an alternative embodiment of that which is shown in FIG. 1, where snap rings and washers are replaced with lock nuts, and where the studs with grooves thereon are replaced with threaded studs. In this second embodiment the fasteners are shown as bolts, but could be in the form of a threaded shaft fixed to a hub or other structure, and with the fasteners in the form of nuts which thread onto such alternative threaded shafts.
FIG. 10 is a perspective view of that which is shown in FIG. 9, with the various parts thereof all assembled together and supporting the fasteners to prevent loosening thereof.

With particular reference to FIGS. 8-10, details of an alternative bolt locking system 110 are described according to a second embodiment. In the second embodiment, the locking system 110 includes a ring 120 which is similar to the ring 20 of the first embodiment, with holes 130 equally spaced to each other, but with threaded studs 140 replacing the studs 40 of the first embodiment locking system 10. The threaded studs 140 extend from a root 142 adjacent to the ring 120, to a tip 144 opposite the root 142. Threads 146 are formed on an outer surface of the threaded stud 140. As a replacement for the snap clamps 50 of the first embodiment, locknuts 150 are provided as a retainer for use with the threaded studs 140 of the ring 120 in the alternative bolt locking system 110.

The lock nuts 150 are rotated down onto the threaded studs 140 to press the key 160 against the ring 120, and while the key 160 has a head opening 170 overlying a head H of a fastener, and with a bore 180 in the key 160 placed over the threaded stud 140. When the lock nuts 150 are tightened, the key 160 is held securely in place and in turn the heads H of the fasteners are held from becoming loose with the alternative bolt locking system 110. This alternative locking system 110 can similarly be utilized with nuts as fasteners mounted to a threaded shaft, as with the first embodiment locking system 10.

In use and operation, and with particular reference to FIGS. 1-3, the bolt locking system 10, and analogous systems, are utilized as follows. Initially, a structure is identified which is to have an item attached thereto, and with the structure having a configuration for accommodating a fastener associated therewith. Typically a series of such fasteners are provided in a circular pattern around a centerpoint. In one embodiment, the structure is a hub of an axle A and the item to be held to the hub of the axle is a wheel W. In another embodiment, a drive structure such as the sprocket could be held to the wheel W and/or the hub of the axle A. The fastener could be a bolt B which threads into a threaded hole in the structure such as the hub of the axle A. As an alternative, the fastener could be a nut which threads onto a threaded shaft affixed to the structure, such as the hub of the axle A. The fasteners which are to be held in place are first removed from the item and structure. Next, the ring 20 is placed adjacent to the item to be held to the structure. The ring 20 is provided in advance with a number of holes 30 matching a number of fasteners and with appropriate spacing between the holes 30 and fasteners so that the ring 20 can accommodate each of the fasteners passing through the holes 30 in the ring 20 (or adjacent to the threaded shaft when the fastener is in the form of a nut threaded onto a threaded shaft).

The fasteners are threaded until the head H of the bolt B or other fastener is adjacent to the outside surface 22 of the ring 20. The head H of the fastener is tightened an appropriate amount. Next, this procedure is repeated until each head H of each fastener has been tightened against the outside surface 22 of the ring 20. Keys 60 are then placed over each of the heads H with the head openings 70 of the key 60 surrounding each head H, and with the bore 80 of each key 60 located upon one of the studs 40 of the ring 20. If rotational alignment prevents such placement of the key 60, the head H of the fastener can be tightened slightly more or slightly less until the key 60 can fit upon the head H with the head H within the head opening 70 and with the bore 80 placed upon one of the studs 40.

Once the keys 60 have been appropriately placed and with the heads H of the fasteners within head openings 70, a retainer is placed on the stud 40. This retainer could be in the form of a snap clamp 50 (or a lock nut 150 if the stud is in the form of a threaded stud 140). Attachment of this retainer causes the key 60 to be held securely in place, and in turn causes the heads H of the fasteners to be prevented from rotating so that the locking system 10 is engaged. Should the locking system 10 need to be disengaged, such as for removal of the item from the underlying structure, the process is reversed by first removing the retainer, such as the snap clamp 50 or lock nut 150. The keys 60 can then be removed, and the fasteners can be unthreaded. Finally, the ring 20 and keys 60 can be collected together for reuse later, and the item (or items) can then be freely removed from the adjacent structure, such as removing a wheel W from a hub of an axle A.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A fastener locking system, comprising in combination:
a ring having an inside surface opposite an outside surface;
said ring having a plurality of holes passing therethrough from said inside surface to said outside surface;
said ring having a plurality of studs extending from said outside surface;
at least one key, said key having an outer surface opposite an inner surface;
said key including a head opening passing through said key from said outer surface to said inner surface;
said key including a bore passing through said key from said outer surface to said inner surface;
said bore spaced from said head opening by a distance similar to a distance from one of said plurality of holes of said ring to one of said plurality of studs of said ring; and
wherein a retainer is associated with at least one of said studs, said retainer attachable to said stud to hold said key upon said stud with said stud passing through said bore of said key.

2. The system of claim 1 wherein said ring is planer in form with a substantially constant thickness between said inside surface and said outside surface.

3. The system of claim 1 wherein said ring includes a central opening causing said ring to be annular in form between an inner edge adjacent to said central opening and an outer edge opposite said inner edge.

4. The system of claim 3 wherein said holes are spaced a common distance from a center of said central opening and said holes are spaced a similar distance from each other.

5. The system of claim 4 wherein each of said studs is located a substantially equal distance from an adjacent one of said plurality of holes.

6. The system of claim 1 wherein said key is planer in form with a substantially constant thickness between said outer surface and said inner surface.

7. The system of claim 1 wherein said retainer includes a nut and with said stud formed as a threaded stud, with said nut rotatable onto said threaded stud on a side of said key opposite said ring.

8. The system of claim 1 wherein said retainer includes a snap ring sized to fit within a groove in said stud, said snap ring holding said key adjacent to said ring.

9. The system of claim 8 wherein said head opening in said key is sized and shaped to fit over a faceted fastener head and prevent fastener rotation when said key is positioned with said head opening of said key around said fastener head.

10. A fastener locking system, comprising in combination:
a ring having an inside surface opposite an outside surface;
said ring having a plurality of holes passing therethrough from said inside surface to said outside surface;
said ring having a plurality of studs extending from said outside surface;
at least one key, said key having an outer surface opposite an inner surface;
said key including a head opening passing through said key from said outer surface to said inner surface;
said key including a bore passing through said key from said outer surface to said inner surface;
said bore spaced from said head opening by a distance similar to a distance from one of said plurality of holes of said ring to one of said plurality of studs of said ring; and
wherein said key includes at least two head openings passing through said key, said head openings having midpoints spaced from each other a distance matching a space between at least two of said plurality of holes passing through said ring.

11. The system of claim 10 wherein said key includes a number of head openings matching a number of said plurality of holes passing through said ring, said ring also including a number of bores matching a number of studs extending from said outer surface of said ring, said bores spaced from each other by distances matching distances between said studs of said ring.

12. The method of claim 10 wherein said fitting step includes the key having at least two head openings passing through the key, the head openings having midpoints spaced from each other a distance matching a spacing between at least two of the plurality of holes passing through the ring; and
wherein said fitting step includes each of the at least two head openings fitting over a separate fastener head.

13. The method of claim 12 wherein said fitting step includes the key having a number of head openings matching a number of the plurality of holes passing through the ring, the ring also including a number of bores matching a number of studs extending from the outer surface of the ring, the bores spaced from each other by distances matching distances between the studs in the ring; and
wherein said fitting step includes each of the head openings fitting over a separate fastener head and each of the bores fitting over one of the studs.

14. The system of claim 10 wherein said ring is planer in form with a substantially constant thickness between said inside surface and said outside surface.

15. The system of claim 10 wherein said ring includes a central opening causing said ring to be annular in form between an inner edge adjacent to said central opening and an outer edge opposite said inner edge.

16. The system of claim 15 wherein said holes are spaced a common distance from a center of said central opening and said holes are spaced a similar distance from each other.

17. The system of claim 16 wherein each of said studs is located a substantially equal distance from an adjacent one of said plurality of holes.

18. The system of claim 10 wherein said key is planer in form with a substantially constant thickness between said outer surface and said inner surface.

* * * * *